(12) United States Patent
Rios Mercadillo (10) Patent No.: US 10,905,115 B2
(45) Date of Patent: Feb. 2, 2021

(54) SMOKE PRODUCING TABLET AND METHOF OF USE

(71) Applicant: ARJESIL INC., Lake Elsinore, CA (US)

(72) Inventor: Victor Rios Mercadillo, Queretaro (MX)

(*) Notice: Subject to any disclaimer, the term of this patent is extended or adjusted under 35 U.S.C. 154(b) by 0 days.

(21) Appl. No.: 16/208,376

(22) Filed: Dec. 3, 2018

(65) Prior Publication Data

US 2020/0060264 A1 Feb. 27, 2020

Related U.S. Application Data

(60) Provisional application No. 62/721,949, filed on Aug. 23, 2018.

(51) Int. Cl.
| | |
|---|---|
| *A01N 25/20* | (2006.01) |
| *A01N 25/34* | (2006.01) |
| *A01N 25/18* | (2006.01) |
| *A01N 65/00* | (2009.01) |

(52) U.S. Cl.
CPC ............. *A01N 25/20* (2013.01); *A01N 25/18* (2013.01); *A01N 25/34* (2013.01); *A01N 65/00* (2013.01)

(58) Field of Classification Search
CPC .................................................... A01N 25/20
See application file for complete search history.

(56) References Cited

U.S. PATENT DOCUMENTS

| | | | |
|---|---|---|---|
| 2005/0242319 A1* | 11/2005 | Posson | A62D 1/06 252/2 |
| 2005/0255047 A1 | 11/2005 | Rocquet | |
| 2009/0099135 A1* | 4/2009 | Enan | A01N 65/08 514/86 |
| 2014/0238258 A1 | 8/2014 | Stoenescu | |

* cited by examiner

*Primary Examiner* — Benjamin J Packard
(74) *Attorney, Agent, or Firm* — Gulick Law; Karima Gulick (57) ABSTRACT

A controlled portable combustion composition, comprising a carrier, where the carrier functions as a binder and as a fuel for combustion, an oxidizer, and, an auxiliary agent, where the auxiliary agent is a transitional substance and a flame retardant which renders the composition flameless; and where substantially all of the carrier, the oxidizer, and the auxiliary agent are converted to smoke at the end of said combustion.

14 Claims, 9 Drawing Sheets

SMOKE PRODUCING TABLET AND METHOF OF USE

CROSS REFERENCE TO RELATED APPLICATIONS

This patent application claims the benefit of U.S. Provisional Application No. 62/721,949, filed Aug. 23, 2018, entitled SMOKE PRODUCING TABLETS.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

The entire content of 62/721,949 is hereby incorporated by reference.

BACKGROUND OF THE DISCLOSURE

1. Field of the Disclosure

The present disclosure relates generally to compositions which produce controlled smoke upon combustion and a method of making portable and nontoxic smoke tablets based on that composition.

2. Description of the Related Art and Summary of the Invention

In markets requiring the usage of chemicals and often hazardous substances, the Environmental Protection Agency (EPA) and other regulatory bodies are imposing stricter regulations on the transportation, handling, dispersion, disposal, and reporting of actual usage of chemicals. These regulations, along with public health concerns, have generated a need for products that address these issues dealing with proper chemical handling, and use of safe nontoxic chemicals capable of addressing everyday home use and agricultural concerns.

To reduce the quantity of chemicals handled, the concentration of the chemical, as applied, has been increasing. This has raised the cost of chemicals per unit weight and has also required more accurate dispensing systems. Hence the need for a nontoxic portable smoke tablet which could release controlled smoke and deliver active ingredients to any desired area or volume.

The present disclosure relates to a smoke producing tablet which can be impregnated with insecticidal repellent or disinfectant active ingredients to combat insects and microbiological contamination. The present disclosure obviates the use of harsh chemicals and is safe to use for organic agriculture and home use.

In fact, the present disclosure relates to a controlled portable combustion composition, which includes a carrier, where the carrier functions as a binder and as a fuel for a combustion, an oxidizer; and, an auxiliary agent, where the auxiliary agent is a transitional substance and a flame retardant which renders the composition flameless, and where substantially all of the carrier, the oxidizer, and the auxiliary agent are converted to smoke at the end of the combustion without leaving any debris or residues behind.

In some embodiments, the controlled portable combustion composition is a portable tablet.

In some portions and ratios, the controlled portable combustion composition has on a mass basis a carrier 3 to 5 times the amount of the oxidizer and an auxiliary agent 0.5 to 0.25 the amount of the oxidizer. In another embodiments, the controlled portable combustion composition also has by mass an auxiliary agent 0.25 the mass of the oxidizer. In some cases, the controlled portable combustion composition by mass has a ratio of a carrier 3 to 5 times that of an oxidizer, making the composition pelletized and compressible into portable tablet form.

In some embodiments, to ensure a nontoxic and organic controlled portable composition, the carrier can include a starch, a sucrose, and/or a dextrose and the oxidizer can include potassium nitrate. Active ingredients can be added to the controlled portable combustion composition. In some cases, the active ingredients are added to the carrier and can be neem oil, an insecticide, a repellent, a disinfectant, a scented ingredient, and/or an essential oil. In these cases, when the controlled portable composition is ignited, and the slow combustion is started, the composition produces a smoke capable of delivering the neem oil, insecticidal, repellent, disinfectant, and/or the scented ingredient through a volume.

In some embodiments, some of the active ingredients can be neem oil, an acrinatrin, an allethrin, a d-allethrin, a d-transaletrin, a d-cis-transaletrin, an alphamethrin, a batrin, a bifenthrin, a bioallethrin, an s-bioallethrin, an isomer of a bioletrin-S-cyclopentyl, a bioetanometrin, a bioresmethrin, a cyclocitrin, a clovaportrin, a gamma-cyhalothrin, a lambda-cyhalothrin, a cypermethrin, an alpha-cipermetrina, a beta-cypermethrin, a cis-cypermethrin, a theta-cypermethrin, a zeta-cypermethrin, a cyphenothrin, a deltamethrin, a depaletrina, an empenthrin, an empenthrin (1R isomer), an esbiothrin, an esfenvalerate, an etofenprox, a fenfluthrin, a fenfopatrina, a fenipiritrina, a fenvalerate, a flubrocitrinato, a flucythrinate, a flumethrin, a fubfenprox, an imiprotrin, a cadethrin, a metofluthrin, a neopinamine, a permethrin, a cis-permethrin, a trans-permethrin, a phenothrin, a phenothrin (1R-trans isomer), a d-fe notrina, a praletrina, a proflutrina, a protrifenbute, a pynamin forte, a piresmetrina, a pyrethrin, a resmetrina, a cis-resmetrina, an RU 15525, a silafluofeno, a tau-fluvalinato, a tefluthrin, a tetrametrina, a tralometrina, a transfluthrin, a ZXI 8901, and/or pyrethrins (pyrethrum).

In other embodiments, the auxiliary agent includes sodium bicarbonate and/or potassium permanganate. In yet another embodiment, the carrier, oxidizer and auxiliary agents all consist of organic materials adapted to generate controlled nontoxic smoke upon ignition.

To generate the controlled portable smoke, one must obtain a controlled portable combustion composition including a carrier where the carrier is a binder and a fuel for combustion, an oxidizer, and an auxiliary agent where the auxiliary agent is a transitional substance and a flame retardant. The user then places the composition in a volume and ignites the composition. After ignition, a reaction between the oxidizer and the auxiliary agent makes the composition flameless within a few seconds of the ignition. Here, a carrier, an oxidizer and an auxiliary agent react to form a controlled smoke which dissipates throughout that volume. At the end of the controlled combustion substantially all of the carrier, the oxidizer, and the auxiliary agent are converted to smoke and that smoke is dissipated smoke at the end of said combustion and that smoke is dissipated throughout the desired area, volume or medium.

In some embodiments, to have the composition substantially converted to smoke at the end of the combustion, the controlled portable smoke has on a mass basis a carrier 3 to 5 times the amount of the oxidizer, and the auxiliary agent 0.5 to 0.25 times the amount of oxidizer. In other embodiments, the controlled portable smoke composition is a portable tablet with a carrier having a mass a ratio of 3 to 5 times the mass of the oxidant. Those ratios make the composition pelletized and compressible into tablet form.

In other embodiments, to generate the controlled portable smoke, the carrier includes at least a starch, a sucrose, and/or a dextrose. In other embodiments, the oxidizer includes potassium nitrate and in yet another embodiment, the auxiliary agent comprises a sodium bicarbonate and/or a potassium permanganate. In yet another embodiment, the carrier, the auxiliary agent and the oxidizer are all made of organic materials. This makes the composition all organic and nontoxic, and also adapted for organic agricultural use, nontoxic use, greenhouse use, office use or home use.

In yet another embodiment, to generate a controlled portable smoke, and a controlled portable smoke capable of delivering certain active ingredients to a chosen area, volume or medium, the composition can further include active ingredient such as neem oil, an insecticide, a repellent, a disinfectant, an essential oil and/or a scented ingredient. The smoke generated from this composition enables delivery of those active ingredients to the chosen and desired medium, and can deliver neem oil, insecticide, repellent, disinfectant, essential oil and/or the scented ingredient to the desired volume.

In some embodiments, to generate the controlled portable smoke, the active ingredients can either be in a solid form or a liquid form. When the active ingredients are in the solid form, a solvent is added to the composition to bind the composition and help compress it into a tablet form. In other embodiments, the controlled smoke generated from 1 gram of the composition covers 1 cubic meter of said volume, and 250 grams of that composition covers 250 cubic meters of the volume. In yet other embodiments, 10 grams of the composition combusts in 70 seconds and substantially all (or about 100%) of the composition is dissipated in the air after combustion is completed. In yet another embodiment, 100 grams of the composition combusts in 6 minutes and substantially all of the composition is dissipated in the air after combustion is completed.

A user can control the volume covered and the time of combustion by adjusting the size of the smoke generating composition, tablet size, and ratios of carrier to oxidizer, to auxiliary agent and to active ingredients.

BRIEF DESCRIPTION OF THE DRAWINGS

The same elements or parts throughout the figures of the drawings are designated by the same reference characters, while equivalent elements bear a prime designation.

DETAILED DESCRIPTION OF THE DISCLOSURE

Figure 1:
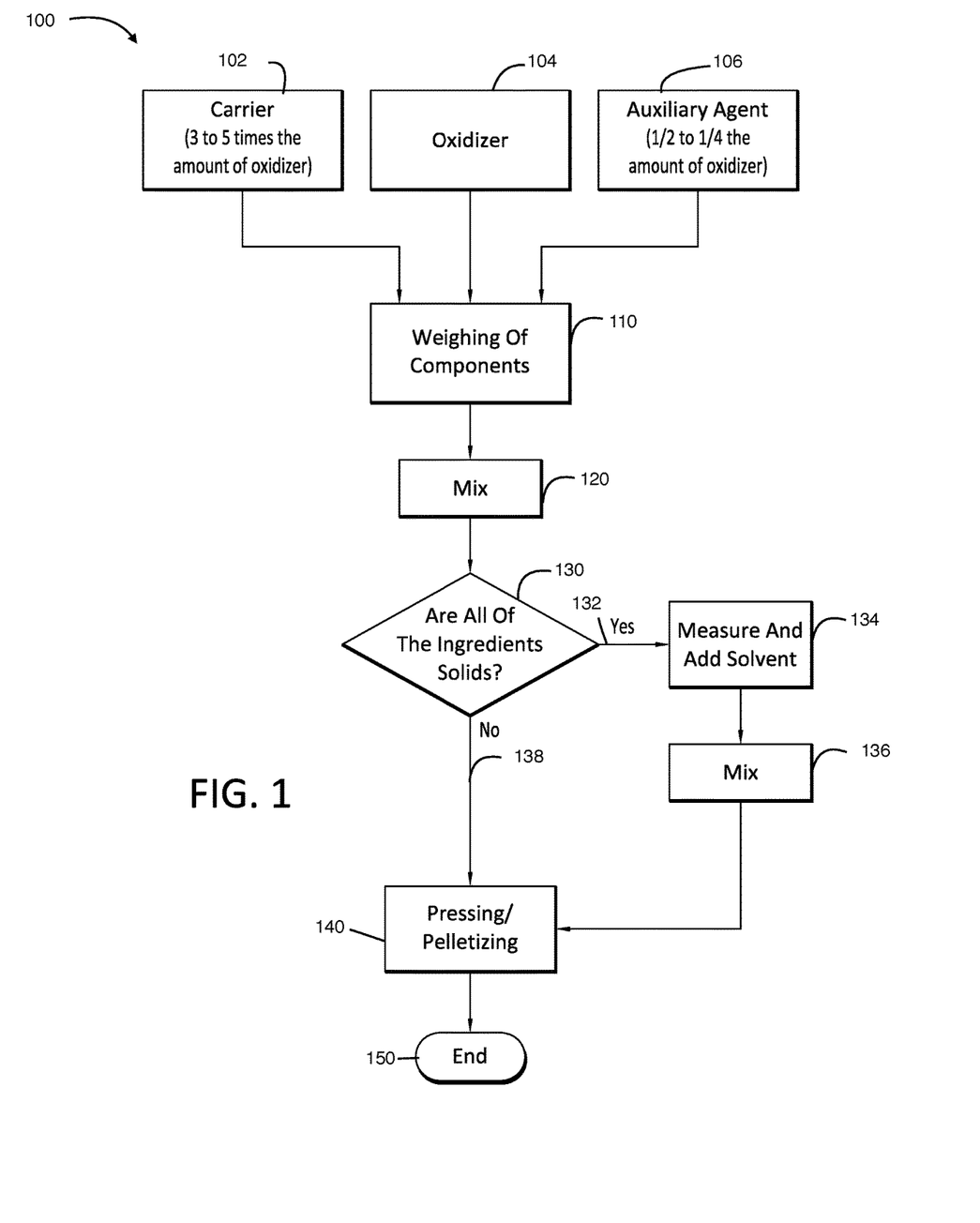
FIG. 1 is a simplified flowchart showing an exemplary method of producing a smoke tablet for generating controlled nontoxic smoke.

Referring now to the drawings and the characters of reference marked thereon, FIG. 1 is a simplified flowchart 100 showing an exemplary method of producing a smoke tablet for generating controlled nontoxic smoke. The controlled portable combustion composition or a smoke tablet of the present disclosure may be used with other types of active ingredients but is primarily used with organic nontoxic elements.

In one embodiment of the present disclosure, the controlled portable combustion composition includes a carrier 102, an oxidizer 104, and an auxiliary agent 106. The carrier functions as a binder and as a fuel for combustion.

In some embodiments, the carrier includes starch, sucrose, dextrose, potassium nitrate, corn starch, rice, wheat, barley, oats and/or any other material that provides soluble carbohydrates. The carrier is an organic material or combination of organic materials suitable for use in organic agriculture or non-toxic home and office use. Starch is a white, odorless, tasteless, granulated or powdered substance, which is abundant in other starches, such as potatoes or cereals. Starch is a macromolecule formed by amylose and amylopectin.

The controlled portable combustion composition or smoke tablet also includes an oxidizer 104. The smoke tablet oxidizer is a substance, element or material capable of oxidizing. In some embodiments, the oxidizer used in this composition is potassium nitrate.

The controlled portable combustion composition or smoke tablet further includes an auxiliary agent 106. In one embodiment, the auxiliary agent is also a transitional substance and a flame retardant which renders the composition flameless after the composition is ignited. In some embodiments, the auxiliary agent includes a sodium bicarbonate and/or a potassium permanganate or any other similar molecular structures to sodium bicarbonate or potassium permanganate, or any combination of similar molecular structures.

After the controlled portable smoke tablet is ignited by a user, there is virtually no flame, a slow combustion and a controlled nontoxic smoke are generated. In the appropriate ratios, the entire composition is consumed and dissipated through smoke at the end of the combustion. That is to say that no element of the composition remains at the end of the combustion and 100% of the composition is consumed and turned into smoke leaving no residue or smoke behind.

In one embodiment, the smoke tablet composition on a mass basis includes a carrier at a ratio of 3 to 5 times the amount of the oxidizer, and the auxiliary agent at a ratio of 0.5 to 0.25 the amount of the oxidizer. When these ratios or any ratios within those ranges are used, the ignition of the composition or smoke tablet leads to a slow combustion process and release of smoke such that when the entire tablet is combusted, no elements or materials are left and the entire tablet is consumed and transformed into smoke. After ignition of the smoke tablet by a user, the composition is nameless and releases a controlled smoke to a desired volume.

In one embodiment, the controlled portable combustion composition includes by mass basis an auxiliary agent at 0.25 the mass of the oxidizer. In other embodiments, the auxiliary agent is either a quarter (0.25), 0.3, 0.35, 0.4, 0.45, half (0.5) or any value between 0.25 and 0.5 or 25% and 50% the mass of the oxidizer. In other embodiments, the auxiliary agent weighs anywhere between a quarter and half the weight of the oxidizer.

Figure 6A:
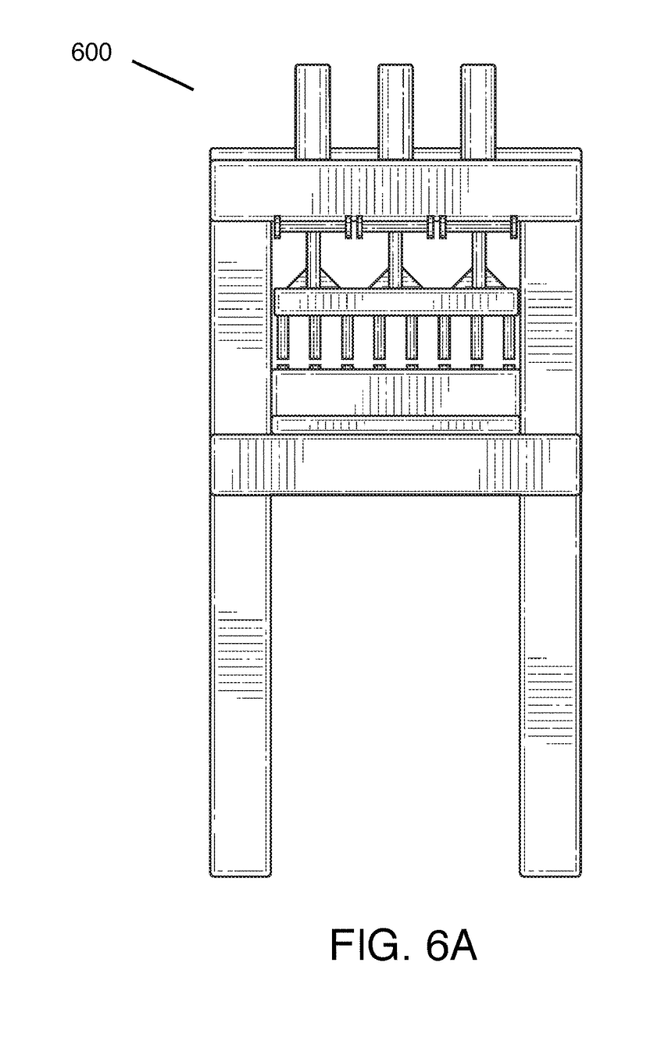
FIG. 6A is a front view of a 3 hydraulic press.
Figure 6B:
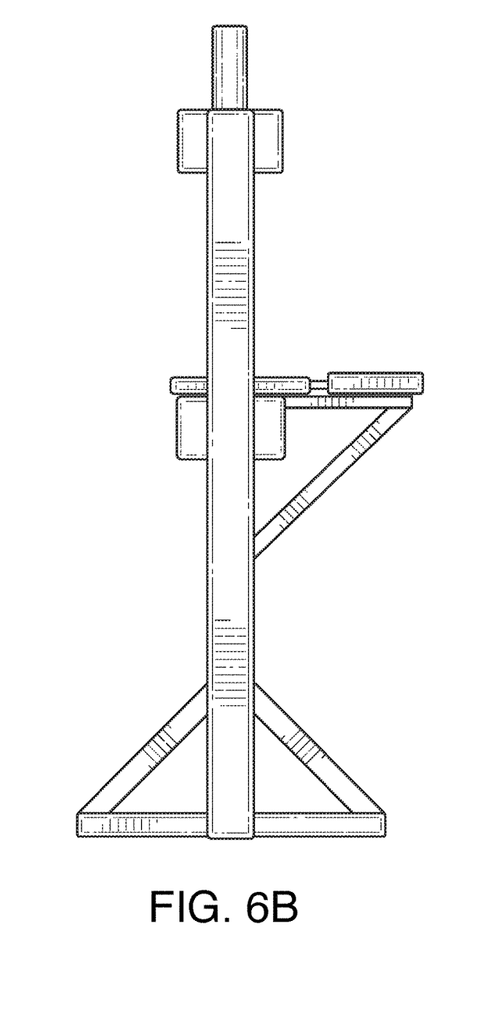
FIG. 6B is a side view of a 3 hydraulic press of FIG. 6A.
Figure 7:
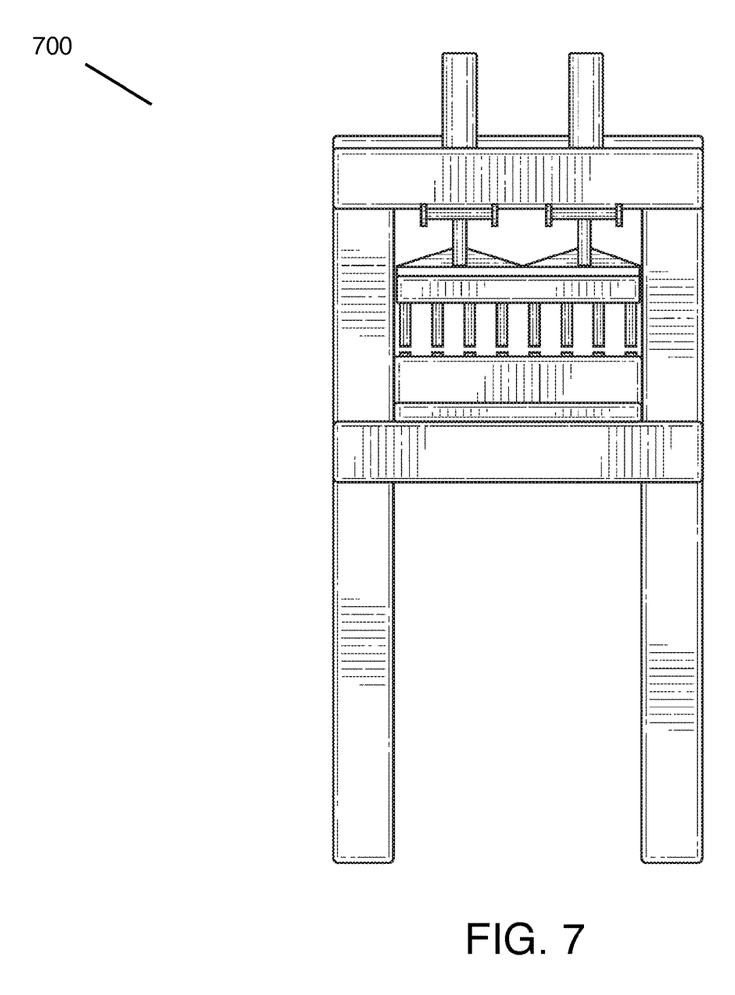
FIG. 7 is a front view of a 2 hydraulic press.

In an alternative embodiment, the smoke tablet composition on a mass basis includes:
 a carrier at a ratio of 3 to 5 times the amount of the oxidizer, or more particularly, it can be:
  3.0 to 3.5 carrier to oxidizer ratio,
  3.5 to 4.0 carrier to oxidizer ratio,
  4.0 to 4.5 carrier to oxidizer ratio,
  4.5 to 5.0 carrier to oxidizer ratio
  Or any value within these ranges or combination of ranges; and
 the auxiliary agent at a ratio of 0.5 to 0.25 the amount of the oxidizer, or more particularly, it can be:
  0.25 to 0.3 auxiliary agent to oxidizer,
  0.3 to 0.35 auxiliary agent to oxidizer
  0.35 to 0.4 auxiliary agent to oxidizer
  0.4 to 0.45 auxiliary agent to oxidizer
  0.45 to 0.5 auxiliary agent to oxidizer
  Or any value within these ranges or combination of ranges In yet another embodiment, the controlled portable combustion composition includes by mass, a ratio of a carrier of 3 to 5 times the mass of an oxidant or oxidizer. These ratios render the composition pelletized and can be compressed into a tablet form. In some embodiments, a hydraulic press is used to compress the composition into tablet form. In other embodiments, a 3 hydraulic cylinder press 600 is used to compress the composition into tablet form, while in alternative embodiments, a 2 hydraulic cylinder press 700 is used to turn the composition into tablet or pellet form.

Figure 8:
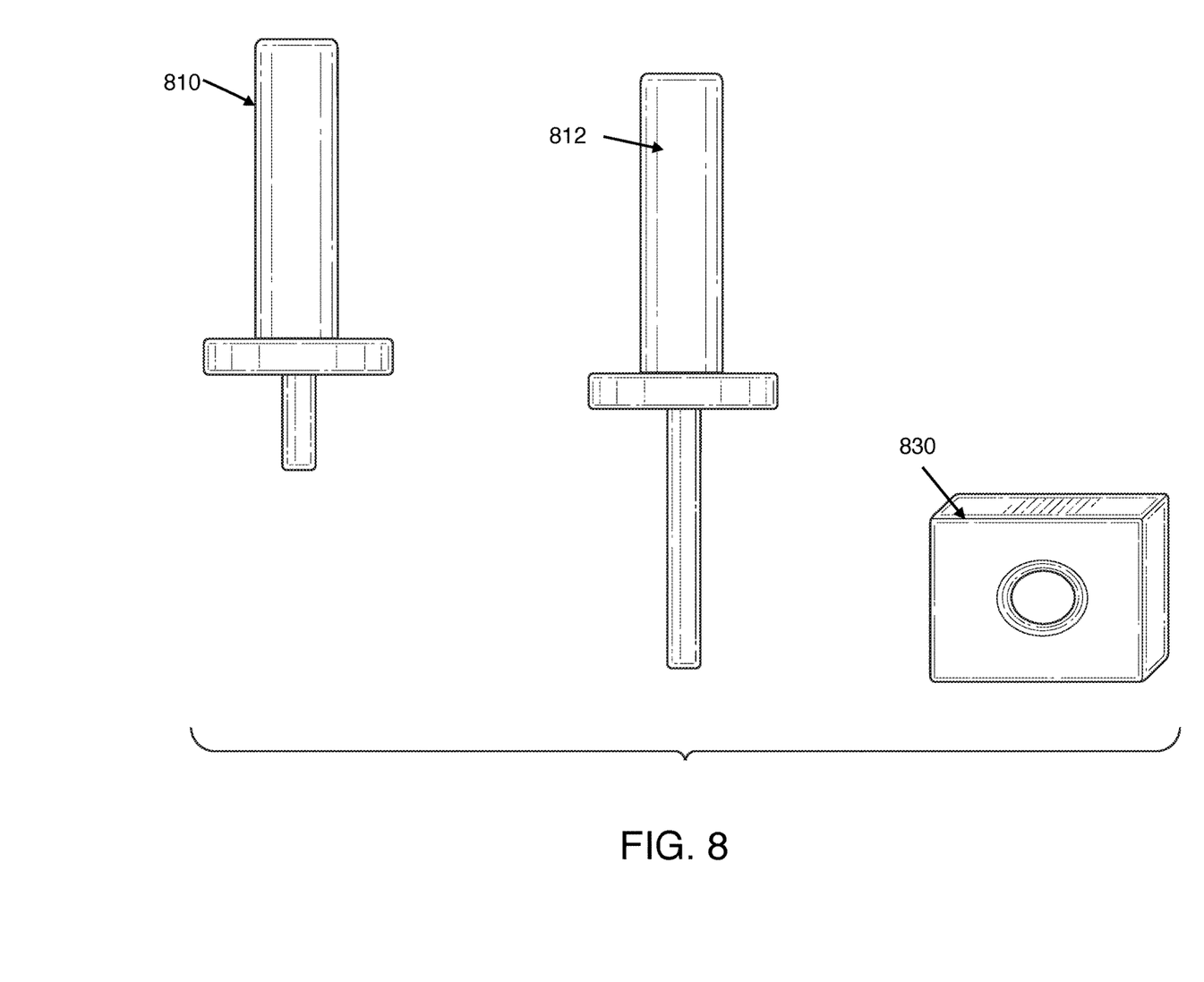
FIG. 8 is front and perspective view of a press cylinder and a front flange.
Figure 9:
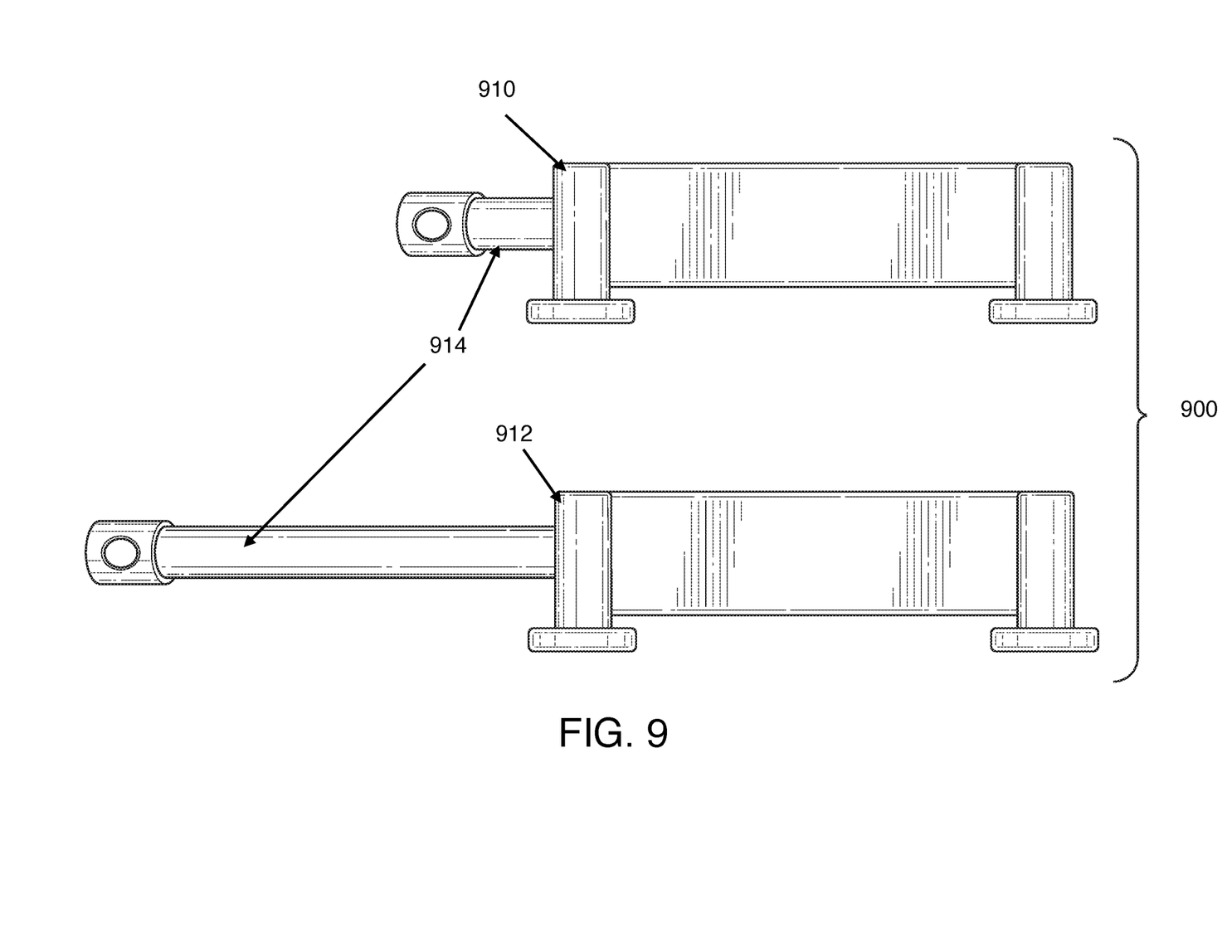
FIG. 9 is side view of a cylinder for sliding base plate.

In one embodiment where a press cylinder is used to turn the composition into tablet form, the press cylinder includes a retracted double acting cylinder 810, an extended double acting cylinder 812 or with a retractable extending stem 914. In other embodiments, the cylinder press is used in conjunction with a male mold, a female mold and/or a mobile board as shown in FIG. 8. The press and extending stem exert pressure on the composition placed within these molds to compress the composition into tablet form.

FIG. 2A through 2D show a round embodiment of a smoke tablet. These embodiments depict various sizes by volume and by weight. So long as the elements of the composition are used in the ratios of the present disclosure, the tablets can be made to any size, to any weight and to any density.

FIG. 3A through 3D show a rectangular embodiment of a smoke tablet. While these figures show round, oval and rectangular forms of smoke tablets, these tablets can take any round, square, rectangular, star, cylindrical, rectangular, pyramidal, and/or polygonal shape or any combination thereof. In addition, the tablets can have round corners or sharper corners. These embodiments depict various sizes by volume and by weight. So long as the elements of the composition are used in the ratios of the present disclosure, the tablets can be made to any size, to any weight and to any density.

In some embodiments, the smoke tablet has a weight or mass of 25 g to 300 g, in another embodiment, the tablet has a weight of 2 g to 270 g, in yet another embodiment, the tablet has a mass of 2 g to 250 g, and in alternative embodiment, the tablet has a weight of 2 g to 230 g, in yet another alternative embodiment, the tablet has a weight of 2 g to 215 g, and in another embodiment, the tablet has a weighs anywhere between 2 g to 200 g.

In an alternative embodiment, the smoke tablet composition has a mass of:
 25 g to 300 g, and particularly:
  25 g to 50 g,
  50 g to 75 g,
  75 g to 100 g,
  100 g to 125 g,
  125 g to 150 g,
  150 g to 175 g,
  175 g to 200 g,
  200 g to 225 g,
  225 g to 250 g,
  250 to 275 g,
  275 g to 300 g,
  Or any value within these ranges or combination of ranges; or,
 2 g to 270 g, and particularly:
  2 g to 3 g,
  3 g to 4 g,
  4 g to 5 g,
  5 g to 10 g,
  10 to 15 g,
  15 to 20 g,
  20 to 25 g,
  25 g to 50 g,
  50 g to 75 g,
  75 g to 100 g,
  100 g to 125 g,
  125 g to 150 g,
  150 g to 175 g,
  175 g to 200 g,
  200 g to 225 g,
  225 g to 250 g,
  250 to 270 g,
  Or any value within these ranges or combination of ranges.

So long as the composition ratios are respected, the tablet can be of any size. In some embodiments, the tablet is a portable size whereas in others, the tablet can have a mass not easily carried. However, in one embodiment of the present disclosure, the tablet has a size, mass, volume and density as to allow it to be consumed by slow combustion on a container, for example, an ashtray or a heat-resistant plate.

While in some embodiments, the tablet can be disposed on a recipient for slow combustion, in other embodiments the tablets can safely be used directly on agricultural land, or safely placed inside a home or office.

The controlled portable combustion composition can be used as a disinfectant, deodorizer, or insect repellant with the addition of the active ingredients to the composition. In some embodiments, the carrier further includes active ingredients such as insecticides, repellents, disinfectants, essential oils such as neem oil and/or scented articles. In these embodiments, when the smoke tablet or composition is ignited, a slow combustion ensues allowing the smoke to deliver the insecticide, repellent, essential oils and/or the scented article to be delivered throughout a desired volume.

The size of the volume covered is controlled by the size of the tablet. Different experiments conducted here for this specific composition at the ratios disclosed show that for each 1 g of the composition, a volume of 1 m³ is covered by the 1 g of the composition, correspondingly, a tablet of 5 g of the disclosed composition at the disclosed ratios cover 5 m³ of volume. Therefore, a room, agricultural land, or any other volume can be fully and completely covered by the smoke generated from the tablet using a tablet mass corresponding and equal to the volume desired to have covered.

The table below lists some examples of volume covered by a given tablet mass:

TABLE 1

Volume covered by given tablet mass

| Tablet Size (weight in g) | Area Covered (m³) |
| --- | --- |
| 1 | 1 |
| 10 | 10 |
| 20 | 20 |
| 25 | 25 |
| 50 | 50 |
| 75 | 75 |
| 100 | 100 |
| 150 | 150 |
| 200 | 200 |
| 250 | 250 |
| 300 | 300 |
| 500 | 500 |
| 1000 | 1000 |

In yet other embodiments, the smoke tablet is a compressed smoke tablet including potato starch and/or sucrose, an oxidizer, and an auxiliary agent to which an active principle is added. In other embodiments, two or more active ingredients can be also added to the composition, for example, 2, 3, 4 or more active ingredients. In the same way and alternatively, the compressed carrier, starch-sucrose tablet, may also include with active insect repellents or a mixture of insecticides and repellent, or disinfectants or a mixture of disinfectants and insecticides or repellents or a mixture of both.

In one embodiment, the active ingredient is added to the carrier element of the smoke tablet, whereas in other embodiments, the active ingredient can be included in the oxidizer element, auxiliary agent or in a combination of the elements making up the smoke tablet composition. In this embodiment, the elements of the composition are not subject to any limitation, provided that the composition is capable of releasing at least one insecticidal, repellent or bactericidal and fungicidal active ingredient when consumed by slow combustion.

In other embodiments, the smoke tablet or composition can include additional active ingredients by impregnating the tablet or composition in the desired additional element such as insecticide, disinfectant, deodorizer or a combination thereof.

In some embodiments, the composition of the present disclosure further includes at least one insecticidal active principle, selected from the group consisting of the pyrethroids, especially the group consisting of acrinatrin, allethrin, d-allethrin, d-transaletrin, d-cis-transaletrin, alphamethrin, batrin, bifenthrin, bioallethrin, S-bioallethrin, isomer of bioletrin-S-cyclopentyl, bioetanometrin, bioresmethrin, cyclocitrin, clovaportrin, gamma-cyhalothrin, lambda-cyhalothrin, cypermethrin, alpha-cipermetrina, beta-cypermethrin, cis-cypermethrin, theta-cypermethrin, zeta-cypermethrin, cyphenothrin, deltamethrin, depaletrina, empenthrin, empenthrin (1R isomer), esbiothrin, esfenvalerate, etofenprox, fenfluthrin, fenfopatrina, fenipiritrina, fenvalerate, flubrocitrinato, flucythrinate, flumethrin, fubfenprox, imiprotrin, cadethrin, metofluthrin, neopinamine, permethrin, cis-permethrin, trans-permethrin, phenothrin, phenothrin (1R-trans isomer), d-fe notrina, praletrina, proflutrina, protrifenbute, Pynamin forte, piresmetrina, pyrethrin, resmetrina, cis-resmetrina, RU 15525, silafluofeno, tau-fluvalinato, tefluthrin, tetrametrina, tralometrina, Transfluthrin, ZXI 8901, pyrethrins (pyrethrum) and any mixture of the active principles mentioned above. In yet another embodiment, the insecticidal active ingredient can be selected from the following active ingredients, wherein the following insecticidal principles can be used alone or in any combination with the aforementioned insecticidal principles.

In another embodiment, the composition can further include inhibitors such as inhibitors of the enzyme acetylcholinesterase (AChE) carbamates, for example, alanicarb, aldicarb, aldoxicarb, alixicarb, aminocarb, bendiocarb, benfuracarb, butacarb, butocarboxim, butoxicarboxim, carbaryl, carbofuran, carbosulfan, cloetocarb, dimethylan, etiofencarb, fenobucarb, phenothiocarb, formetanate, furathiocarb, isoprocarb, metamsodic, methiocarb, methomyl, metolcarb, oxamyl, pirimicarb, promecarb, propoxur, thiodicarb, thiofanox, trimetacarb, XMC, xylocarb, triazamate.

In another embodiment, the composition can further include organophosphates, for example, acephate, azamethiphos, azinphos (methyl, ethyl), bromophos-ethyl, bromfenvinphos, (methyl), butathiophos, cadusafos, carbophenothione, chloroethoxyphos, chlorophenviphos, Chloroprophs, chloropyrifos, (methyl/ethyl), coumaphos, cyanofenfos, cyanofos, chlorophenviphos, demeton-S-methyl, demeton-S-methylsulfone, dialiphos, diazinone, diclofenthione, dichlorovos/DDVP, dicrotophos, dimethoate, dimethylvinfos, dioxabenzofos, disulfotona, EPN, ethion, ethoprophos, etrimphos, fanfur, fenamiphos, fenitrothione, fensulfothione, fenthion, flupirazophos, fonophos, formothione, fosmetilane, fostiazoate, heptenophos, iodophenes, iprobenfos, isazofos, isofenfos, isopropyl O-salicylate, isoxationa, malathion, mecarbam, methacryphos, methamidophos, methidathione, mevinphos, monocrotophos, naled, ometoate, oxidemoton-methyl, parathion (methyl/ethyl), phenoate, phorate, fosalone, fosmet, phosphamidone, phosphocarb, foxima, pirimiphos, protoate, pyraclofos, pyridafenthione, pyridathione, quinalfos, sebufos, sulfotep, sulprofos, tebupirinfos, temefos, terbufos, tetrachlorovinfos, thiometone, triazofos, triclorfon, vamidotiona.

In yet another embodiment, the composition can further include voltage-dependent sodium channel modulators, DDT, oxadiazines, for example, indoxacarb, Semicarbazone, for example, metaflumizone (BAS3201) Agonists/antagonists of the acetylcholine receptor, chloronicotinyl such as: acetamiprid, clothianidin, dinotefuran, imidaclopride, nitempiram, nitiazine, thiaclopride, thiamethoxam, Nicotine, bensultap, cartap Acetylcholine receptor modulators, Spinosyn, for example, spinosad; Chloride channel antagonists controlled by GABA Organochlor, for example, camphechlor, chlorodane, Endosulfan, gamma HCH, HCH, heptachlor, lindane, methoxychlor, fiprol, for example, acetoprol, ethiprole, fipronil, pyrafluprol, pyriprole, vaniliprole. Chloride channel activators mectin, for example, abamectin, emamectin, emamectin benzoate, ivermectin, lepimectin, milbemycin.

In one embodiment, the composition can further include mimetics of the juvenile hormone, for example, diofenolane, epofenonane, phenoxycarb, hydroprene, quinoprene, methoprene, pyridoxyphene, tripreno Agonists/disrupters of ecdysone, diacylhydrazine, eg, chromafenozide, halofenozide, methoxyfenozide, tebufenozide.

In another embodiment, the composition can further include inhibitors of the synthesis of chitin, benzoylureas, for example, bistriflurone, diflubenzurone, fluazurone, flucycloxuron, diflubenzuron, fluazuron, flucycloxuron, flufenoxuron, hexaflumuron, lufenuron, novaluron, noviflumuron, penfluron, teflubenzuron, triflumuron, buprofezin, cyromazine. Inhibitors of the oxidative phosphorylation of ATP, such as diafenturone.

In yet another embodiment, the composition can further include organotin compounds, for example, azocyclotin, fenbutatin, decouplers of oxidative phosphorylation by interruption of the proton gradient H, Pyrroles, for example, chlorophenapyr. Dinitrophenols, for example, dinobutone, DNOC biological compounds, hormones or pheromones, active ingredients with certain mechanisms of action, aluminum phosphide, methyl bromide, sulfuryl fluoride; feeding inhibitors, for example, cryolites, flonicamide, pymetrozines; mite growth inhibitors, for example, clofentezin, benzoximate, bifentate, bromopropylate, buprofezin, quinomethionate and/or verbutin.

In yet another embodiment, the composition can further include any type or mixture of naturally derived pesticides, such as but not limited to botanical pyrethrins, plant extracts, essential oils, plant-based oils and/or oleoresins. In addition, the active ingredient's action can also be used alone or in combination with other active ingredients, such as diethyltoluamide (DEET) and/or picaridine.

An insecticidal active ingredient is also understood as a repellent or synergistic active ingredient in the context of the present invention.

On a mass basis, in some embodiments, content of active or additional ingredient can be from 0.01 to 100.0 mg/g of the total composition; from 0.05 to 80 mg/g; from 0.1 to 80 g/g. 60 mg/g; 0.15 to 40 mg/g; 0.20 to 20 mg/g of the smoke tablet, in each case a carrier being taken as a base, and in some embodiments, a starch-sucrose tablet carrier, which has the aforementioned weight.

In yet another embodiment, a disinfectant active ingredient can be selected from the several active ingredients, wherein the following disinfectant principles can be used alone or in any combination with the aforementioned insecticidal or repellent principles for controlling microorganisms suspended in air and deposited on surfaces. Phenolics like o-phenyl phenol, hexachlorophene, and thymol Quaternary ammonium compounds, biguanide polymers, and/or many essential oils.

The smoke tablet and composition can also be used according to the invention and further include other components. In particular they may contain natural and/or synthetic odors, as well as organic and inorganic dyes and/or any flavoring agents.

In some embodiments, the natural odors include essential oils of plants, neem oil, leaves, stems, flowers or parts thereof and similar vegetable oils. In addition to the flavoring ingredient, the formulation according to the invention may optionally also contain the additives customary in the flavoring industry, such as patchouli oil, or similar ones which inhibit volatilization such as eugenol or similar viscosity regulating agents.

In another embodiment, the composition can further include deodorant agents such as, for example, lauryl methacrylate, geranyl crotonate, acetophenone myristate, p-methyl ketophenone benzaldehyde, benzyl acetate, benzyl propionate, amylcinnamic aldehyde, anhydrous aldehyde, diphenyl, methyl benzoate, ethyl benzoate, methylphenyl acetate, ethylphenyl acetate, neoline, safrole, etc.

In another embodiment the carrier according to the invention, in particular the starch tablets, can furthermore contain synergists alone or in combination with the aforementioned insecticidal active ingredients, such as octachlorodipropyl ether and piperonyl butoxide. Micro encapsulated insecticidal or aromatic active ingredients can also be used. By micro-encapsulation of the different insecticidal active ingredients, unwanted release under standard environmental conditions can be avoided.

In the context of the present disclosure, so long as the ratios of the composition are respected, the only element that controls the effectiveness of the smoke tablet is the process of forming the carrier element.

The composition according to the present disclosure is formed as shown in FIG. 1 by weighing the 3 main elements: a carrier 102, an oxidizer 104, and an auxiliary agent 106. The carrier as show in the figure must be 3 to 5 times the amount of the oxidizer 104 while the auxiliary agent 106 must be 25% to 50% the amount of oxidizer by mass. After the components of the composition are weighted 110, and after ensuring that the ratios are within the limits disclosed herein, the components of the composition are mixed together. When all the components or ingredients of the composition 102 (carrier), 104 (oxidizer) and 106 (auxiliary agent) are in solid state (i.e, powders or other) 132, a solvent 134 must be added to the composition before the composition can be pressed and turned into a tablet form. When at least one of the components or ingredients is liquid, the components are mixed together and pressed and turned into a tablet.

In some embodiments, the carrier 102 comprises a starchy grain, a sucrose, and/or a potato starch. Starch grains vary in shape and size. They are not soluble in cold water, but when the temperature increases, gelatinization occurs, and they hydrate. Starch is a white, odorless, tasteless, granulated or powdered substance, which is abundant in other starches, such as potatoes or cereals. Starch is a macromolecule formed by amylose and amylopectin and serves as a food reserve for most vegetables. The starch used as carrier in the present disclosure is not subject to special restrictions so long as the substance selected it is adequate to absorb at least one corresponding insecticidal or repellent active ingredient and, after lighting, without the need to extinguish any flame, is appropriate to release at least one insecticidal or repellent principle, without essentially producing a decomposition.

The term "smoke tablet" or "tablet" is understood, in the context of the present disclosure as the mass obtained by mixing a carrier 102 such as sucrose and/or starch, an oxidizer 104 such as potassium nitrate, an auxiliary agent 106 and a solvent such as water and given a compaction processing to prepare tablets. In some embodiments where an active principal is added, and where the active ingredient is liquid, the active ingredient can act as the solvent, and no other solvents are necessary when mixing the carrier, oxidizer and auxiliary agents to render the composition in tablet or pellet form.

The active ingredient can be any active ingredient selected for the composition, as long as the chosen active ingredient (insecticidal, repellent, essential oil such as neem oil or disinfectant, etc) is an active ingredient capable of being released through the air and through a volume as part of the smoke generated by the tablet during the slow combustion and at low temperatures (for example 350 to 600° C.) of the carrier, in particular of the starch/sucrose carrier without decomposing, and without broadly losing its active ingredient action. For the present disclosure, "essentially without decomposition" is defined as a decomposition of at most 80%, preferably a maximum of 70%, 60%, 50%, or even at a low of 40% decomposition rate.

As depicted in FIG. 1, the smoke tablet composition comprises at least a carrier 102, an oxidizer 104, and an auxiliary agent 106. The auxiliary agent is a transitional substance and a flame retardant which makes the composition flameless such as when a user ignites the tablet the flame is instantly turned off, and where the tablet continues to release the rest of the composition through smoke, until all the composition is consumed and converted to smoke.

The composition of the present disclosure gets entirely converted into smoke at the end of the slow combustion process, such that substantially all of the carrier, the oxidizer, and the auxiliary agent are converted to smoke at the end of said combustion.

In some embodiments, the controlled portable combustion composition also comprises an active ingredient which can be an insecticide, a repellent, a disinfectant, an essential oil, and/or a scented article. The combustion of the composition, tablet or smoke tablet helps deliver those active ingredients like the insecticidal, the repellent, the disinfectant, essential oil and/or the scented article through a volume. The volume can be an open area such as an agricultural land, or an enclosed one such as a home, office, or a an enclosed building.

In some embodiments, the present disclosure relates to a smoke tablet impregnated with insecticidal, repellent or disinfectant active ingredients. The tablet or composition can be used to combat insects and microbiological contamination, or just be to disinfect an area or scent a particular area, or have all of those desired effects combined.

In some embodiments, the present disclosure can be suitable for combating flying insects, such as mosquitoes, flies, the species of *Musca domestica*, moths, ants, mites, cockroaches, silverfish, aphids, spider mites, and/or other pests.

In certain embodiments, the tablet is lit and without the need to be extinguished immediately, since no flame is produced. The composition can then be allowed to burn slowly, for example, in a suitable container. The duration of this slow combustion depends on the weight of the tablet or composition. In general, the slow burn times reach from one minute to several hours depending on the material of the carrier and the weight of the carrier and the load of the tablet.

In some embodiments, the following metrics and observations were recorded:

In some embodiments, the insecticidal, repellent or disinfection are ingredients especially suitable for use in enclosed rooms, for example, in rooms, basements, warehouses, warehouses, silos, cellars, greenhouses, stables. However, in other embodiments, the composition and smoke tablet can be used outdoors, for example, gardens, terraces, agricultural land or when camping.

Most disinfectants or insecticides known in the market use aerosols, oily sprays and spirals, which requires the consumption of a large number of natural sources such as kerosene, propane/butane, wood flour, adhesives, as well as various adjuvants of formulation. The use of the present disclosure entails the elimination of the corresponding packaging, such as, for example, cans, valves, plastic bottles, etc.

In one embodiment of the present disclosure, the tablet or composition can be made for combating insects and includes a carrier capable of being consumed by slow combustion provided with at least one active ingredient insecticide, repellent, or disinfectant for example, by impregnating or modifying the formulation. In another embodiment, the carrier according to the present disclosure is formed in such a way that, after having been ignited with fire, it does not require the flame to be extinguished, since the flame does not occur and the ignited composition is flameless, and the carrier continues to be consumed by slow combustion since it does not extinguish completely. Through slow combustion, the carrier releases at least one active ingredient insecticide or repellent or disinfectant so it manages to fight insects and control microbiological contamination, i.e. bacteria and fungi.

FIG. 1 is a simplified flowchart 100 showing an exemplary method of producing a smoke tablet for generating controlled nontoxic smoke. In one embodiment, the composition is made by mixing a carrier 102, an oxidizer 104, and an auxiliary agent 106 in the disclosed ratios, that is the carrier being 3 to 5 times the amount of oxidizer, and the auxiliary agent being ½ to a ¼ the amount of the oxidizer. The subsequent step to making the composition involves weighing all the ingredients 110 as shown in FIG. 1 and mixing 120 the measured elements. In the embodiments where all the elements/ingredients are in solid state 130, a solvent is measured and added to the mixture, in order to be able to press the composition into tablet form. If all components are in solid state 132, a solvent is added and mixed as shown in 136. If one of the elements is in liquid form, 138, then the elements can just be mixed together, then pressed, pelletized 140 and/or turned into a tablet form 150.

TABLE 2

Lab Test Results for some embodiments of the present disclosure

| Tablet size (cm Width) | Weight (may vary ± 1%) (g) | Ignition time range*** (sec) | Burning temperature range*** (° C.) (° F.) | Burning time range*** (min) | Area Covered (m³) | Remarks |
|---|---|---|---|---|---|---|
| 3.6 1.5 | 25 | 5-10 | 100-140 200-275 | 1-2 | 25 | ** |
| 5.5 1.5 | 50 | 5-10 | 120-150 250-300 | 3-4 | 50 | ** |
| 5.5 3.0 | 100 | 5-10 | 120-150 250-300 | 5-6 | 100 | ** |
| 7.6 3.5 | 250 | 5-10 | 120-150 250-300 | 6-7 | 250 | ** |

** Qualitative evaluation determined visually indicated good smoke yield, no burnt color and good combustion rate
***Temperatures were registered using an infrared, high precision, non-contact, digital, laser thermometer.

In some embodiments the composition can further include an active ingredient (not shown in the figures) and include one or more of the following elements: neem oil, acrinatrin, allethrin, d-allethrin, d-transaletrin, d-cis-transaletrin, alphamethrin, batrin, bifenthrin, bioallethrin, s-bioallethrin, isomer of a bioletrin-S-cyclopentyl, bioetanometrin, bioresmethrin, cyclocitrin, clovaportrin, gamma-cyhalothrin, lambda-cyhalothrin, cypermethrin, alpha-cipermetrina, beta-cypermethrin, cis-cypermethrin, theta-cypermethrin, zeta-cypermethrin, cyphenothrin, deltamethrin, depaletrina, empenthrin, empenthrin (1R isomer), an esbiothrin, esfenvalerate, etofenprox, fenfluthrin, fenfopatrina, fenipiritrina, fenvalerate, flubrocitrinato, flucythrinate, flumethrin, fubfenprox, imiprotrin, cadethrin, metofluthrin, neopinamine, permethrin, cis-permethrin, trans-permethrin, phenothrin, phenothrin (1R-trans isomer), d-fe notrina, praletrina, proflutrina, protrifenbute, pynamin forte, piresmetrina, pyrethrin, resmetrina, cis-resmetrina, RU 15525, silafluofeno, tau-fluvalinato, tefluthrin, tetrametrina, tralometrina, transfluthrin, ZXI 8901, and/or pyrethrins (pyrethrum).

In alternative embodiments, the auxiliary agent of the controlled portable combustion composition includes sodium bicarbonate and/or potassium permanganate.

In yet another embodiment, the carrier, the oxidizer and the auxiliary agents all consist of organic materials adapted to generate controlled nontoxic smoke upon ignition. In these embodiments, the entire composition is organic, and when organic active ingredients are added to the composition, the entire tablet is organic and can be suited for organic agricultural use, or for safe home or office use.

In some embodiments, the impregnated carrier materials to be used, especially the compressed starch pellets, can be prepared by any usual method of impregnation, as long as the starch pellet is not damaged during impregnation, for example, by spraying the carrier with a solution of the insecticide and the subsequent drying, for example, in the air or by immersing the carrier in an insecticidal solution and the subsequent drying in the air. Other suitable methods of impregnation are impregnation by means of a pipette.

In another embodiment, the carriers, especially the starch tablets, of the insecticidal agents can be prepared by imbibition of the suitable material of the carrier, especially the starch-sucrose tablet, with a corresponding solution or emulsion. For this purpose, preferential carriers which have already been provided with the synergistic additives for evaporation control are preferably used as starting material.

In yet another embodiment of the present invention, the carrier is provided with an auxiliary agent for slow combustion. In this case, it can be potassium permanganate and/or sodium bicarbonate. The corresponding solutions or emulsions with at least one insecticidal active principle can have an oil or water base. In addition, the insecticidal active ingredient can also further include components, such as, for example, phenyl-alpha-naphthylamine or similar or benzophenones, and emulsion adjuvants, for example, Span 80 or fatty acid esters.

In some embodiments, the composition can further include dyes, inorganic pigments, iron oxide, titanium oxide, ferrocyan blue and organic dyes, such as alizarin, azopigments and metalophthalocyanine and trace elements, such as iron, manganese, boron, copper, cobalt, molybdenum and/or zinc salts.

In one embodiment, an aqueous solution or emulsion is used to apply the insecticidal active ingredient on the carrier, especially on the starch tablet.

In some embodiments, a method of generating controlled portable smoke can include the steps of obtaining a controlled portable combustion composition which has a carrier (here the carrier is a binder and a fuel for a combustion), an oxidizer and an auxiliary agent which functions as a transitional substance and a flame retardant. The composition is then placed in a volume and ignited by a user. A reaction between the oxidizer and the auxiliary agent renders the composition flameless within seconds of an ignition. After ignition the carrier, the oxidizer and the auxiliary agent react to form a controlled smoke which can dissipate in any volume. In addition, 100% of the carrier, the oxidizer, and the auxiliary agent are converted to dissipated smoke at the end of the combustion.

In some embodiments, the method of generating the controlled portable smoke includes on a mass basis a carrier 3 to 5 times the amount of the oxidizer; and the auxiliary agent 0.5 to 0.25 the amount of oxidizer.

In other embodiments, the method of generating controlled portable smoke includes by mass a ratio of carrier of 3 to 5 times the mass of the oxidant. This ratio is what helps turn the composition into a tablet form and can be pelletized.

In yet another embodiment, the method of generating controlled portable smoke includes a carrier with a starch, a sucrose, and/or a dextrose and a potassium nitrate. In such embodiments, the auxiliary agent includes at least one of: a sodium bicarbonate and a potassium permanganate.

In some embodiments the carrier, the auxiliary agent and the oxidizer consist of organic materials suited for organic agricultural use, nontoxic use, or home use. To produce the smoke, a user is to ignite the tablet—tablet becomes flameless within microseconds—making the ignited tablet flameless and all the elements are ingredients are dissipated through a volume at the end of the combustion.

In another embodiment, the method of generating controlled portable smoke includes a carrier which comprises an active ingredient comprising at least one of: an insecticide, a repellent, a disinfectant, and a scented article. Here, the smoke is adapted to deliver the insecticide, the repellent, the disinfectant, and the scented article to a desired volume.

In some embodiments the active ingredients can either be in a solid form or a liquid form, and when the active ingredients are in the solid form, a solvent is added to the composition to bind the composition in a tablet form.

In other embodiments, each 1 gram of the smoke tablet composition covers 1 cubic meter of a volume. This is linear such that 50 g of smoke tablet cover 50 cubic meters, 100 g cover 100 cubic meters 250 grams of composition covers 250 cubic meters of the volume.

In some embodiments, the controlled portable smoke is made such that 10 grams of the composition combusts in 70 seconds and substantially all of said composition is dissipated in the air after combustion is completed. In another embodiment, 100 grams of the composition combusts in 6 minutes and substantially all of the composition is dissipated in the air after combustion is completed. In yet another embodiment, the controlled portable smoke is made such that the size of the composition controls a combustion time and a smoke volume.

Figure 2A:
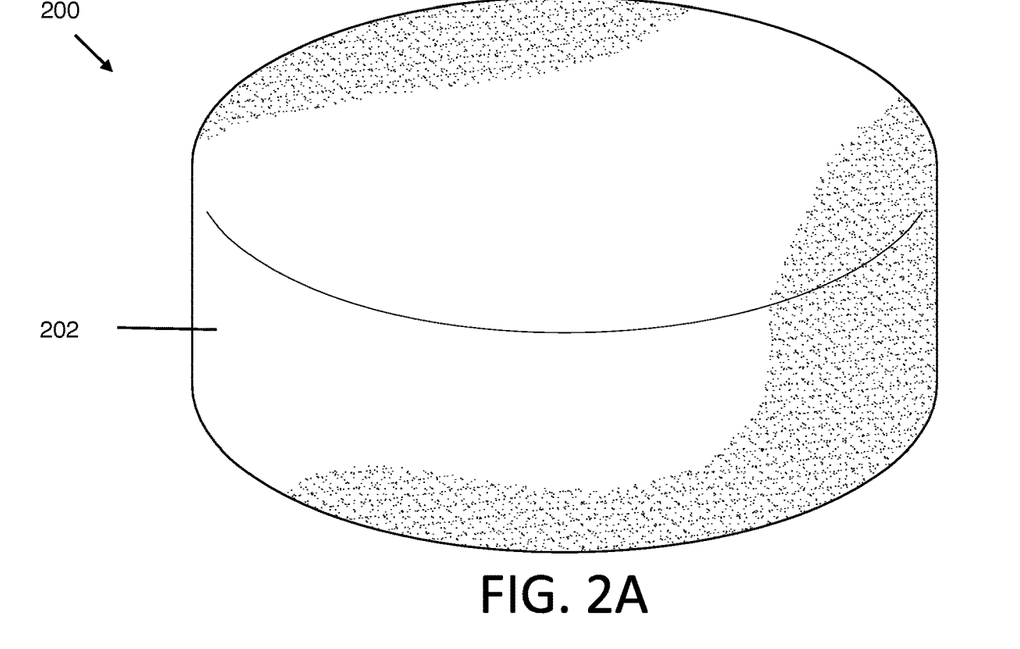
FIGS. 2A, 2B, 2C, and 2D depict perspective views of a portable smoke tablet embodiment showing various smoke tablet sizes.
Figure 2B:
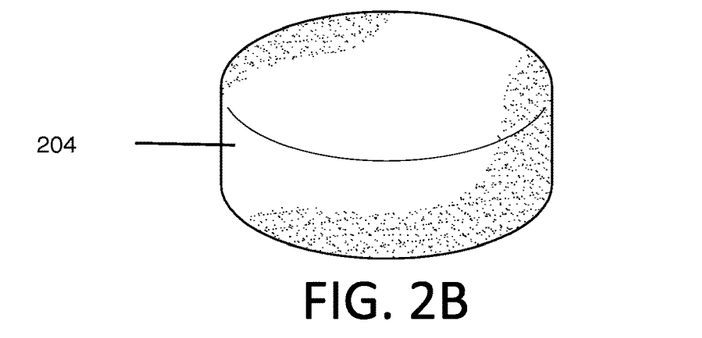
Figure 2C:
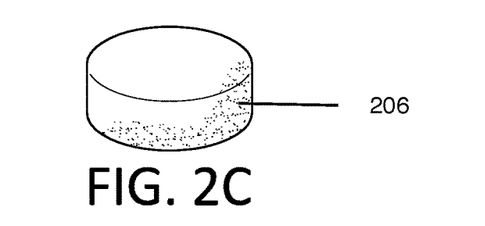
Figure 2D:
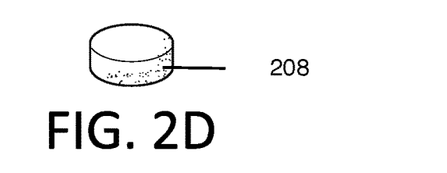
Figure 3A:
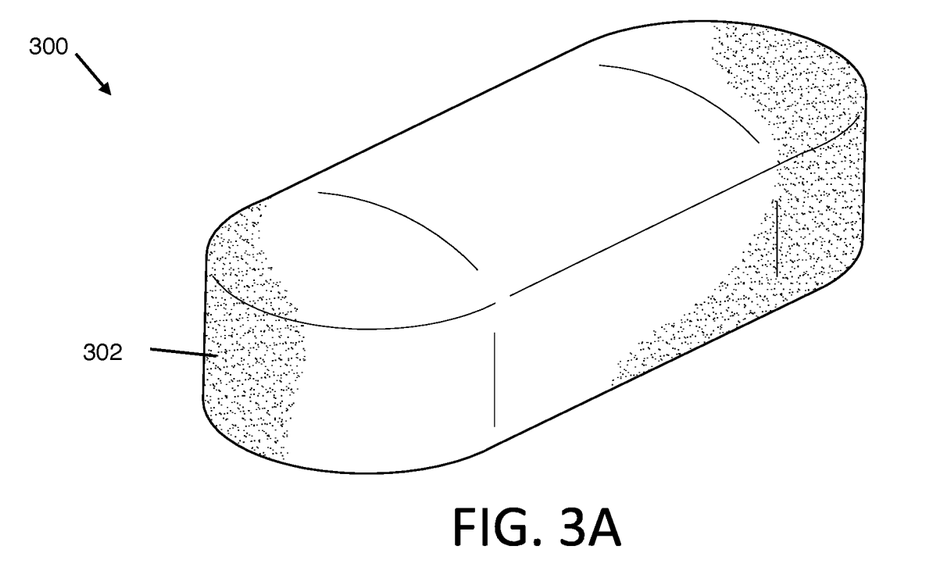
FIGS. 3A, 3B, 3C, and 3D depict perspective views of an alternative smoke tablet embodiment showing various smoke tablet sizes.
Figure 3B:
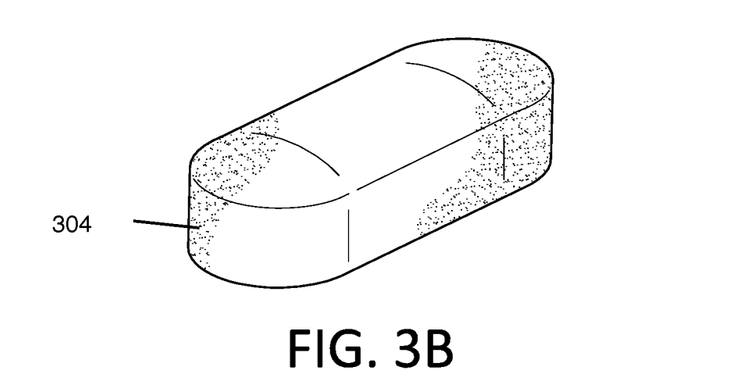
Figure 3C:
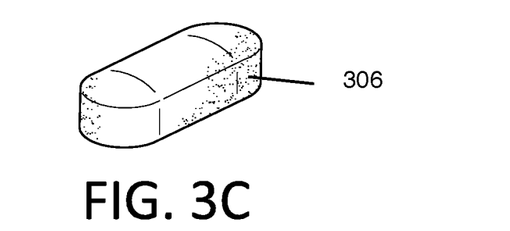
Figure 3D:
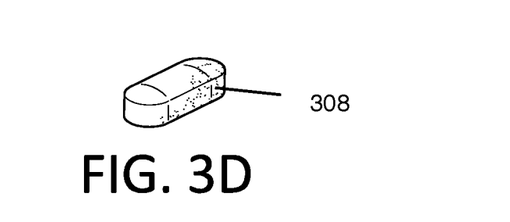

FIGS. 2A, 2B, 2C, and 2D depict perspective views of a smoke tablet embodiment showing various smoke tablet sizes. 200 shows a round tablet embodiment, 202 to 208 show large to small tablets. 202 and FIG. 2A shows the largest round tablet embodiments, whereas FIG. 2B is smaller than 2A and 204 is a smaller embodiment than 202, and FIG. 2C is even smaller than 2A and 2B and FIG. 2D is even smaller than 2A through 2C.

FIGS. 3A, 3B, 3C, and 3D depict perspective views of an alternative smoke tablet embodiment showing various smoke tablet sizes. 300 shows a rectangular tablet embodiment. 302 through 308 and FIGS. 3A through 3D show a larger to smaller rectangular embodiment. While FIGS. 2 and 3 show a round and rectangular embodiment, the tablet can take any shape or form, such as a star, a heart, an animal shape or other polygonals.

Figure 4:
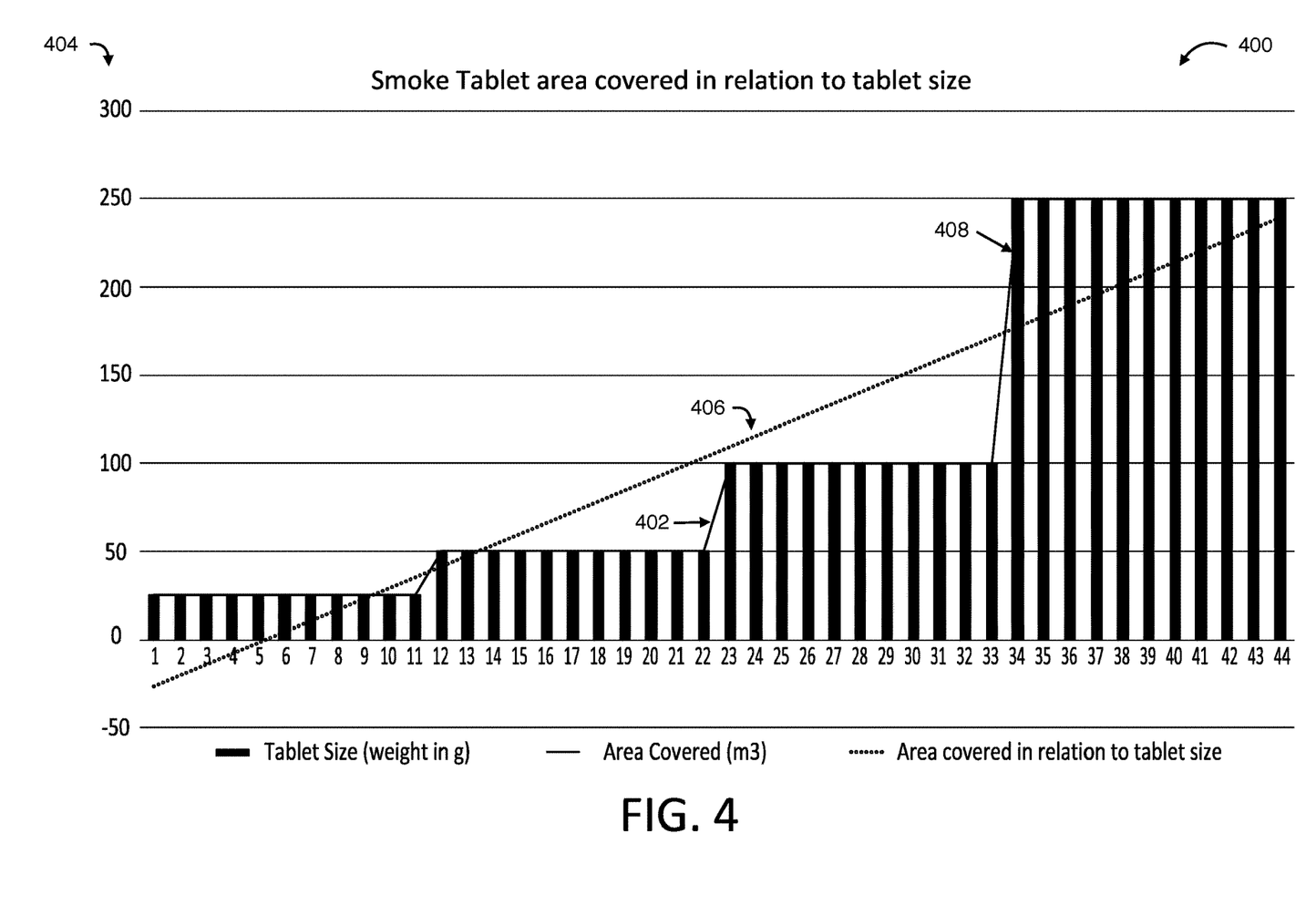
FIG. 4 is a graph comparing volume and area covered in meters$^3$ by a smoke produced by a smoke tablet, to tablet weight in grams for one embodiment of a smoke tablet.

FIG. 4 is a graph comparing volume and area covered in meters$^3$ by a smoke produced by a smoke tablet to tablet weight in grams for one embodiment of a smoke tablet. 400 is a graph comparing volume and area covered in meters$^3$ by a smoke produced by a smoke tablet to tablet weight in grams for one embodiment of a smoke tablet. 402 is a line representing area and volume covered in meters$^3$, 404 an area covered in m$^3$, 406 is the volume and area covered in meters$^3$ to tablet weight in grams for one embodiment of a smoke tablet and 408 is the tablet weight in grams.

Figure 5:
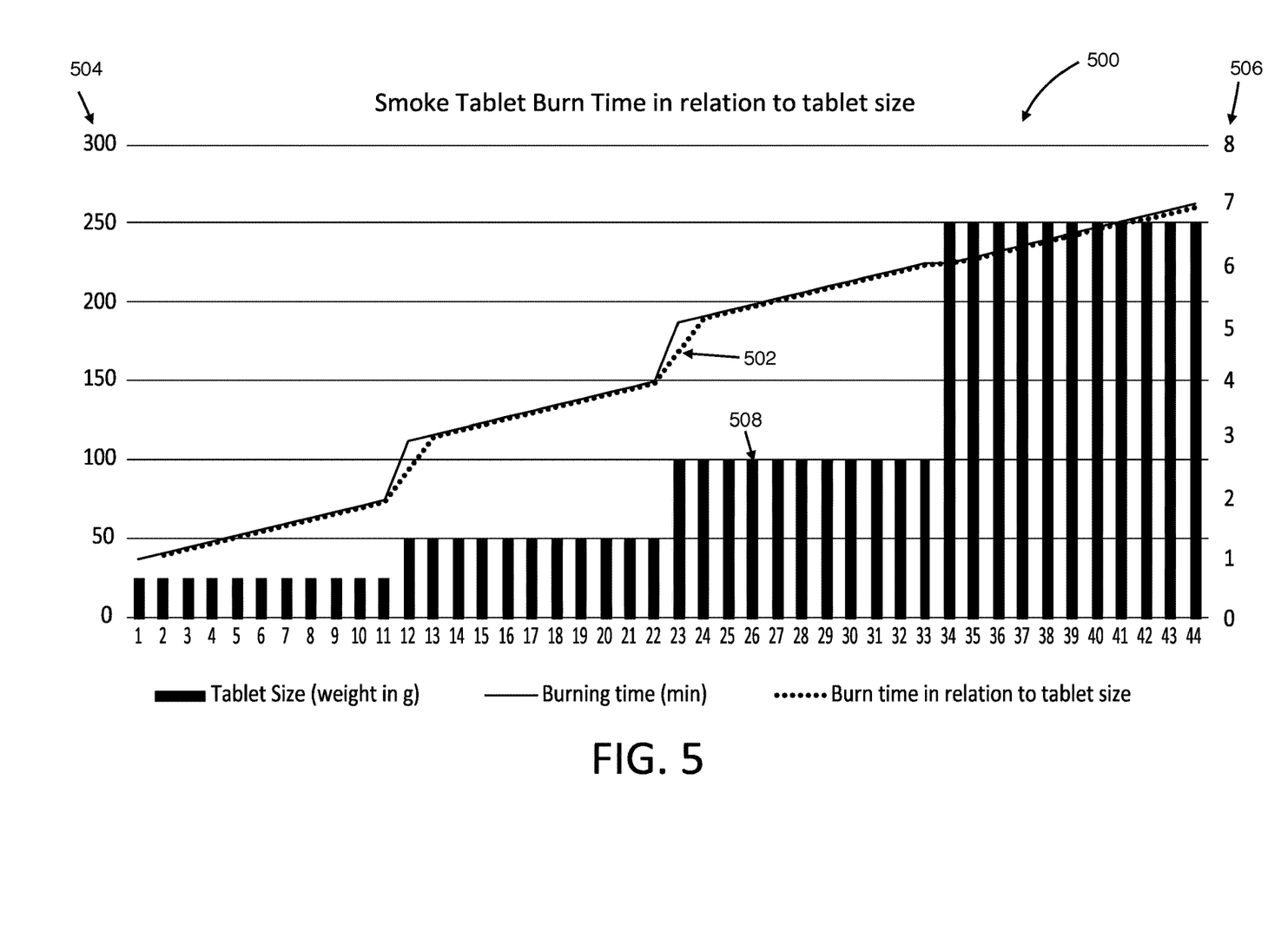
FIG. 5 is a graph comparing a smoke tablet burn time in minutes to a tablet size and tablet weight in grams for another embodiment of a smoke tablet.

FIG. 5 is a graph comparing a smoke tablet burn time in minutes to a tablet size and tablet weight in grams for another embodiment of a smoke tablet. 500 is graph comparing smoke tablet burn time in minutes to a tablet size and tablet weight in grams, 502 shows the burn time in relation to tablet size/weight in grams, 504 shows a tablet weight in g represented by the axis, and 506 shows a burn time in minute axis while 508 shows tablet weight in grams.

FIG. 6A is a front view of a 3 hydraulic press, FIG. 6B is a side view of a 3 hydraulic press. In some embodiments, this 3 hydraulic press is used to turn the composition into a tablet. FIG. 7 is a front view of a 2 hydraulic press. In other embodiments, the 2 hydraulic press is used to turn the composition into a tablet.

FIG. 8 shows front and perspective view of a press cylinder and a front flange. Here, the FIG. shows 810 double acting press cylinders in rest position, 812 double acting press cylinders with extended stem and 830 a mold front flange. In some embodiments, the mixed composition is inserted into a mold and front flange. The press cylinder is then extended from rest position and a stem is extended into an extended position. The composition is first inserted into the mold, and the stem is then inserted into the mold pressing the composition to take the shape of the mold.

FIG. 9 is side view of a cylinder for sliding base plate, 900 double acting cylinders in rest and extended stem position, 910 double acting cylinder in rest position, 912 double acting cylinder with extended stem and 914 stem (here shown with 1 inch diameter.)

In some embodiments, the starch-sucrose substrate is impregnated with at least one insecticidal active principle, selected from the group consisting of the pyrethroids, especially the group consisting of acrinatrin, allethrin, d-allethrin, d-transaletrin, d-cis-transaletrin, alphamethrin, batrin, bifenthrin, bioallethrin, S-bioallethrin, isomer of bioletrin-S-cyclopentyl, bioetanometrin, bioresmethrin, cyclocitrin, clovaportrin, gamma-cyhalothrin, lambda-cyhalothrin, cypermethrin, alpha-cipermetrina, beta-cypermethrin, cis-cypermethrin, theta-cypermethrin, zeta-cypermethrin, cyphenothrin, deltamethrin, depaletrina, empenthrin, empenthrin (1R isomer), esbiothrin, esfenvalerate, etofenprox, fenfluthrin, fenfopatrina, fenipiritrina, fenvalerate, flubrocitrinato, flucythrinate, flumethrin, fubfenprox, imiprotrin, cadethrin, metofluthrin, neopinamine, permethrin, cis-permethrin, trans-permethrin, phenothrin, phenothrin (1R-trans isomer), d-fe notrina, praletrina, proflutrina, protrifenbute, Pyamin forte, piresmetrina, pyrethrin, resmetrina, cis-resmetrina, RU 15525, silafluofeno, tau-fluvalinato, tefluthrin, tetrametrina, tralometrina, Transfluthrin, ZXI 8901, pyrethrins (pyrethrum) and any mixture of the active principles mentioned above.

In yet another embodiment, the insecticidal active ingredient can be selected from the following active ingredients, wherein the following insecticidal principles can be used alone or in any combination with the aforementioned insecticidal principles.

In other embodiments, inhibitors can be added. Inhibitors of the enzyme acetylcholinesterase (AChE) carbamates, for example, alanicarb, aldicarb, aldoxicarb, alixicarb, aminocarb, bendiocarb, benfuracarb, butacarb, butocarboxim, butoxicarboxim, carbaryl, carbofuran, carbosulfan, cloetocarb, dimethylan, etiofencarb, fenobucarb, phenothiocarb, formetanate, furathiocarb, isoprocarb, metamsodic, methiocarb, methomyl, metolcarb, oxamyl, pirimicarb, promecarb, propoxur, thiodicarb, thiofanox, trimetacarb, XMC, xylocarb, triazamate can be used.

In yet another embodiment, other ingredient such as organophosphates are used. For example, acephate, azamethiphos, azinphos (methyl, ethyl), bromophos-ethyl, bromfenvinphos, (methyl), butathiophos, cadusafos, carbophenothione, chloroethoxyphos, chlorophenviphos, Chloroprophs, chloropyrifos, (methyl/ethyl), coumaphos, cyanofenfos, cyanofos, chlorophenviphos, demeton-S-methyl, demeton-S-methylsulfone, dialiphos, diazinone, diclofenthione, dichlorovos/DDVP, dicrotophos, dimethoate, dimethylvinfos, dioxabenzofos, disulfotona, EPN, ethion, ethoprophos, etrimphos, fanfur, fenamiphos, fenitrothione, fensulfothione, fenthion, flupirazophos, fonophos, formothione, fosmetilane, fostiazoate, heptenophos, iodophenes, iprobenfos, isazofos, isofenfos, isopropyl O-salicylate, isoxationa, malathion, mecarbam, methacryphos, methamidophos, methidathione, mevinphos, monocrotophos, naled, ometoate, oxidemoton-methyl, parathion (methyl/ethyl), phenoate, phorate, fosalone, fosmet, phosphamidone, phosphocarb, foxima, pirimiphos, protoate, pyraclofos, pyridafenthione, pyridathione, quinalfos, sebufos, sulfotep, sulprofos, tebupirinfos, temefos, terbufos, tetrachlorovinfos, thiometone, triazofos, triclorfon, and/or vamidotiona can be used.

In yet another embodiment, voltage-dependent sodium channel modulators, DDT, oxadiazines, for example, indoxacarb, Semicarbazone, for example, metaflumizone (BAS3201) Agonists/antagonists of the acetylcholine receptor, and/or chloronicotinyl can be used.

In one embodiment, the following agents can be used: acetamiprid, clothianidin, dinotefuran, imidaclopride, nitempiram, nitiazine, thiaclopride, thiamethoxam, Nicotine, bensultap, cartap Acetylcholine receptor modulators, Spinosyn, for example, spinosad; Chloride channel antagonists controlled by GABA Organochlor, for example, camphechlor, chlorodane, Endosulfan, gamma HCH, HCH, heptachlor, lindane, methoxychlor, fiprol, for example, acetoprol, ethiprole, fipronil, pyrafluprol, pyriprole, and/or vaniliprole.

In yet another embodiment, chloride channel activators can be used, such as mectin, abamectin, emamectin, emamectin benzoate, ivermectin, lepimectin, milbemycin, mimetics of the juvenile hormone, for example, diofenolane, epofenonane, phenoxycarb, hydroprene, quinoprene, methoprene, pyridoxyphene, tripreno, agonists/disrupters of ecdysone, diacylhydrazine, eg, chromafenozide, halofenozide, methoxyfenozide, tebufenozide, inhibitors of the synthesis of chitin, benzoylureas, for example, bistriflurone, diflubenzurone, fluazurone, flucycloxuron, diflubenzuron, fluazuron, flucycloxuron, flu-fenoxuron, hexaflumuron, lufenuron, novaluron, noviflumuron, penfluron, teflubenzuron, triflumuron, buprofezin, cyromazine, inhibitors of the oxidative phosphorylation of ATP, for example, diafenturone, rganotin compounds, for example, azocyclotin, fenbutatin, decouplers of oxidative phosphorylation by interruption of the proton gradient H, Pyrroles, for example, chlorophenapyr, dinitrophenols, for example, dinobutone, DNOC, biological compounds, hormones or pheromones, active ingredients with unknown or non-specific mechanisms of action, gasification means, for example, aluminum phosphide, methyl bromide, sulfuryl fluoride, feeding inhibitors, for example, cryolites, flonicamide, pymetrozines, mite growth inhibitors, for example, clofentezin, benzoximate, bifentate, bromopropylate, buprofezin, quinomethionate, and/or verbutin.

In yet another embodiment, the insecticidal active ingredient can be selected from the following active ingredients, wherein the following insecticidal principles can be used alone or in any combination with the aforementioned insecticidal principles. Any type or mixture of naturally derived pesticides, such as but not limited to botanical pyrethrins, plant extracts, essential oils, plant-based oils and oleoresins. An insecticidal active ingredient is also understood as a repellent or synergistic active ingredient in the context of the present invention. The active ingredients of repellent action can also be used alone or in combination with other active ingredients, for example, diethyltoluamide (DEET) and picaridine. Regarding the content of the insecticidal active principle, the carrier provided according to the invention, especially the carrier of starch tablets, must not comply with special conditions. In some embodiments, the content of insecticidal active ingredient can be from 0.01 to 100.0 mg/g of carrier, from 0.05 to 80 mg/g, from 0.1 to 80 g/g. 60 mg/g, 0.15 to 40 mg/g, especially of 0.20 to 20 mg/g of the starch tablet, in each case a carrier being taken as a base, especially a starch-sucrose tablet carrier, which has the aforementioned weight.

In still another embodiment, a disinfectant active ingredient can be selected from the several active ingredients, wherein the following disinfectant principles can be used alone or in any combination with the aforementioned insecticidal or repellent principles for controlling microorganisms suspended in air and deposited on surfaces. Phenolics like o-phenyl phenol, hexachlorophene, and thymol. Quaternary ammonium compounds, biguanide polymers, and many essential oils. The carriers to be used according to the invention, especially the starch pellets, may also contain other components. In particular they may contain natural and/or synthetic odors, as well as organic and inorganic dyes. The natural odors may have been selected, for example, from the group of essential oils of plants, leaves, stems, flowers or parts thereof and similar vegetable oils. In addition to the flavoring ingredient, the formulation according to the invention may optionally also contain the additives customary in the flavoring industry, such as patchouli oil, or similar ones which inhibit volatilization such as eugenol or similar viscosity regulating agents. The carrier according to the invention may also contain deodorant agents such as, for example, lauryl methacrylate, geranyl crotonate, acetophenone myristate, p-methyl ketophenone benzaldehyde, benzyl acetate, benzyl propionate, amylcinnamic aldehyde, anhydrous aldehyde, diphenyl, methyl benzoate, ethyl benzoate, methylphenyl acetate, ethylphenyl acetate, neoline, safrole, etc. The carrier according to the invention, in particular the starch tablets, can furthermore contain synergists alone or in combination with the aforementioned insecticidal active ingredients, such as octachlorodipropyl ether and piperonyl butoxide. Micro encapsulated insecticidal or aromatic active ingredients can also be used. By micro-encapsulation of the different insecticidal active ingredients, unwanted release under standard environmental conditions can be avoided.

The impregnated carrier materials to be used according to the invention, especially the compressed starch pellets, can be prepared by any usual method of impregnation, as long as the starch pellet is not damaged during impregnation, for example, by spraying the carrier with a solution of the insecticide and the subsequent drying, for example, in the air or by immersing the carrier in an insecticidal solution and the subsequent drying, for example, in the air. Other suitable methods of impregnation are impregnation by means of a pipette. Therefore, the carriers, especially the starch tablets, of the insecticidal agents according to the invention, in one embodiment, can be prepared, for example, by imbibition of the suitable material of the carrier, especially the starch-sucrose tablet, with a corresponding solution or emulsion. For this purpose, preferential carriers which have already been provided with the synergistic additives for evaporation control are preferably used as starting material.

In yet another embodiment of the present invention, the carrier is provided with an auxiliary agent for slow combustion. In this case it can be, for example, potassium permanganate or sodium bicarbonate. The corresponding solutions or emulsions with at least one insecticidal active principle can be based on oil or water. They also contain, in addition to at least one insecticidal active ingredient-possibly additional components, such as, for example, phenyl-alpha-naphthylamine or similar or benzophenones, and emulsion adjuvants, for example, Span 80 or fatty acid esters. Dyes can be used as inorganic pigments, for example, iron oxide, titanium oxide, ferrocyan blue and organic dyes, such as alizarin, azo-pigments and metalophthalocyanine and trace elements, such as iron, manganese, boron, copper, cobalt, molybdenum and zinc salts.

Tablets of the present disclosure can be made of any size and any weight so long as the ratio of carrier, auxiliary agent and oxidants are preserved.

In some embodiments, lighting the tablet starts the ignition process, the tablet gets ignited for a split seconds and an auxiliary agent turns out the flame right away and within seconds or microseconds, and the slow combustion process is started and lasts until the entire tablet is consumed.

In some embodiments, smoke tablets of the present disclosure comprise a starch carrier component, an oxidant component and an auxiliary agent for slow combustion. In a preferred embodiment, the ratio of the mixture is carrier component to oxidant 3 to 1, oxidant from 5-3 to 1 and auxiliary agent: ¼ of the oxidant—anywhere from ½ to ⅓. A special ratio for ingredient ignites and produces smoke even without the active ingredients and starts a slow combustion process without flames or fire. Size and weight of the smoke tablet controls the duration and controlled area, however, there are no limits to how small or large the tablet needs to be, so long as the proportion of oxidant to auxiliary agent is respected.

The tablet of the present disclosure can be used in various industries such as agriculture, organic agriculture, home, business or restaurant use. Sizes and weight of tablet varies making the tablet scalable and appropriate for various uses.

As mentioned above, other embodiments and configurations may be devised without departing from the spirit of the invention and the scope of the appended claims.

The invention claimed is:

1. A controlled portable combustion composition, comprising:
   a carrier, wherein said carrier functions as a binder and as a fuel for a combustion;

an oxidizer; and, an auxiliary agent, wherein said auxiliary agent is a transitional substance and a flame retardant which renders the controlled portable combustion composition flameless; and wherein substantially all of the carrier, the oxidizer, and the auxiliary agent are converted to smoke at an end of said combustion; and wherein said controlled portable combustion composition is organic and nontoxic.

2. The controlled portable combustion composition of claim 1 wherein the carrier comprises at least one of: a starch, a sucrose, and a dextrose, wherein the oxidizer includes at least a potassium nitrate and wherein the auxiliary agent comprises at least one of a sodium bicarbonate and a potassium permanganate.

3. An organic nontoxic controlled portable combustion composition, comprising:

a carrier, wherein said carrier functions as a binder and as a fuel for a combustion;

an oxidizer; and, an auxiliary agent, wherein said auxiliary agent is a transitional substance and a flame retardant which renders the controlled portable combustion composition flameless; and wherein substantially all of the carrier, the oxidizer, and the auxiliary agent are converted to smoke at an end of said combustion; and wherein the auxiliary agent comprises a potassium permanganate.

4. The controlled portable combustion composition of claim 3 wherein the carrier, the oxidizer, and the auxiliary agents consist of organic materials adapted to generate controlled organic and non-toxic smoke upon ignition.

5. A method of generating an organic nontoxic controlled portable smoke comprising:

(a) obtaining an organic nontoxic controlled portable combustion composition which comprises:
(1) a carrier; wherein said carrier is a binder and a fuel for a combustion;
(2) an oxidizer; and,
(3) an auxiliary agent; wherein said auxiliary agent functions as a transitional substance and a flame retardant;

(b) placing said composition in a volume; and, (c) igniting said composition, wherein
(1) a reaction between the oxidizer and said auxiliary agent renders said composition flameless within a few seconds of an ignition;
(2) wherein said carrier, said oxidizer and said auxiliary agent react to form an organic nontoxic controlled smoke adapted to dissipate in said volume; and
(3) wherein substantially all of the carrier, the oxidizer, and the auxiliary agent are converted to dissipate smoke at the end of said combustion.

6. The method of generating the organic nontoxic controlled portable smoke of claim 5 wherein said composition comprises on a mass basis the carrier 3 to 5 times an amount of the oxidizer; and the auxiliary agent 0.5 to 0.25 the amount of oxidizer.

7. The method of generating the organic nontoxic controlled portable smoke of claim 6 wherein said composition is a portable tablet wherein by mass a ratio of said carrier of 3 to 5 times the mass of said oxidant renders the composition pelletized.

8. The method of generating the organic nontoxic controlled portable smoke of claim 5 wherein, the carrier comprises at least one of a starch, a sucrose, and a dextrose;

the oxidizer includes potassium nitrate;

wherein the auxiliary agent comprises at least one of: a sodium bicarbonate and a potassium permanganate; and wherein said carrier, said auxiliary agent, and said oxidizer consist of organic materials adapted for organic agricultural use, nontoxic use, greenhouse use, office use, or home use.

9. The method of generating the organic nontoxic controlled portable smoke of claim 5 wherein, the composition further comprises an active ingredient comprising at least one of: an insecticide, a repellent, a disinfectant, an essential oil, and a scented ingredient; and wherein said smoke is adapted to deliver the insecticide, the repellent, the disinfectant, the essential oil, and the scented ingredient to said volume.

10. The method of generating the organic nontoxic controlled portable smoke of claim 9 wherein said active ingredients are either a solid form or a liquid form, and when said active ingredients are in the solid form, a solvent is added to the composition to bind said composition in a tablet form.

11. The method of generating the organic nontoxic controlled portable smoke of claim 5 wherein said controlled smoke generated from 1 gram of said composition covers 1 cubic meter of said volume, and wherein 250 grams of said composition covers 250 cubic meters of the volume.

12. The method of generating the organic nontoxic controlled portable smoke of claim 5 wherein 10 grams of said composition combusts in 70 seconds and wherein substantially all of said composition is dissipated in a volume after combustion is completed.

13. The method of generating the organic nontoxic controlled portable smoke of claim 5 wherein 100 grams of said composition combusts in 6 minutes and wherein substantially all of said composition is dissipated in the air after combustion is completed.

14. The method of generating the organic nontoxic controlled portable smoke of claim 5 wherein a size of said composition controls a combustion time and a smoke volume.

* * * * *